Mar. 27, 1923. 1,450,023
P. E. EDELMAN
AUTOMATIC CONTROL OF REACTIONS
Filed Dec. 13, 1919 5 sheets-sheet 3

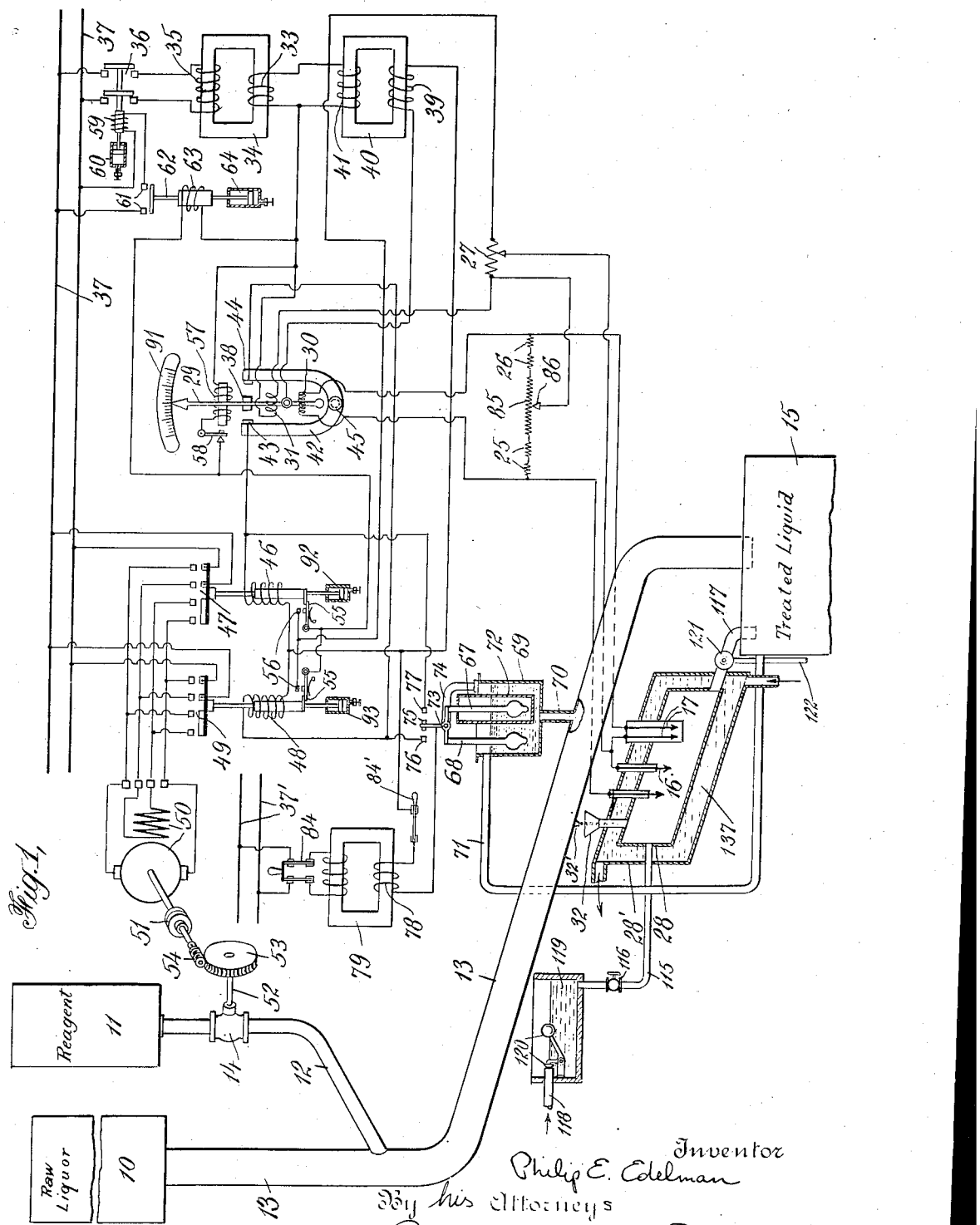

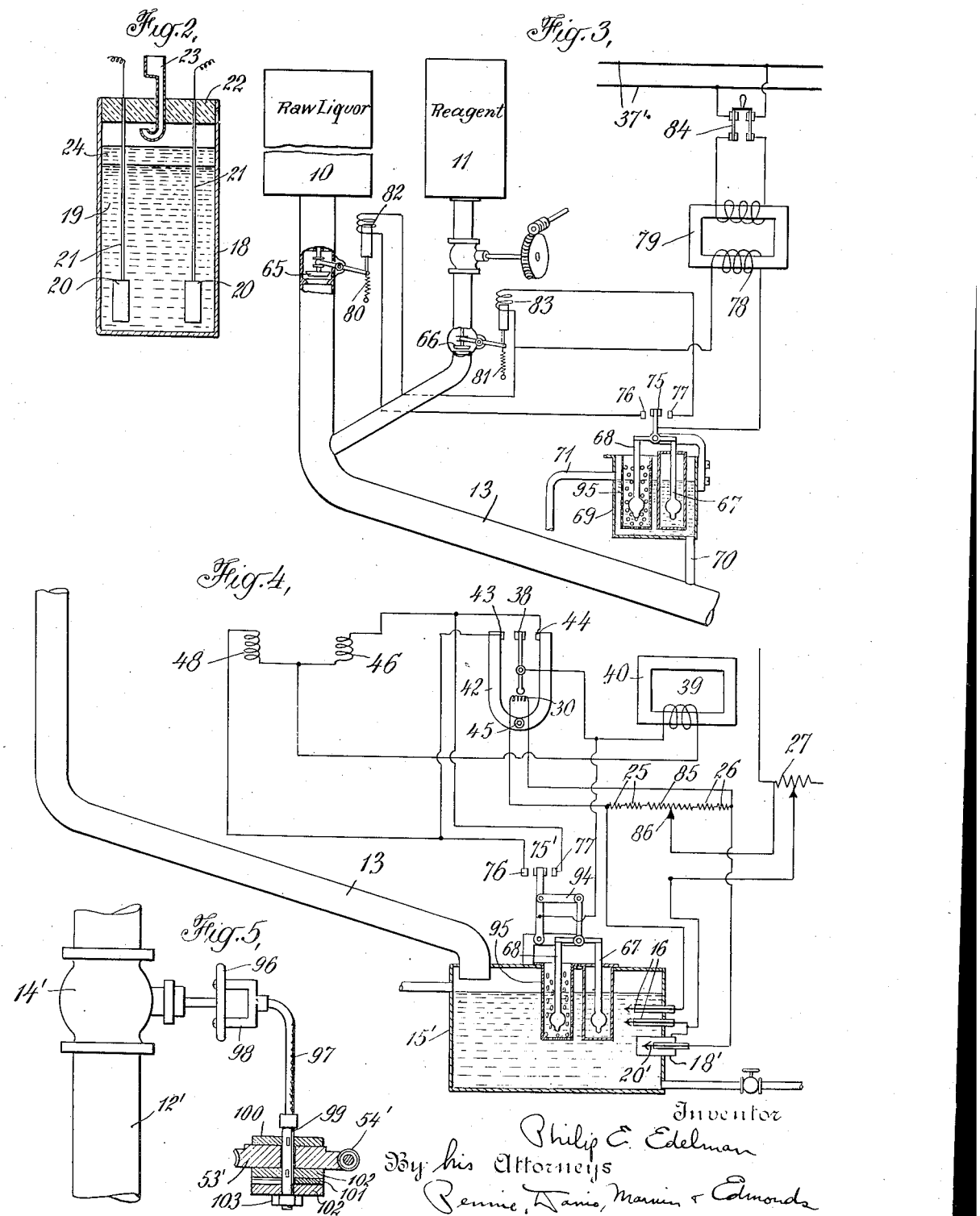

Inventor
Philip E. Edelman
By his Attorneys
Bennie, Davis, Marvin + Edmonds

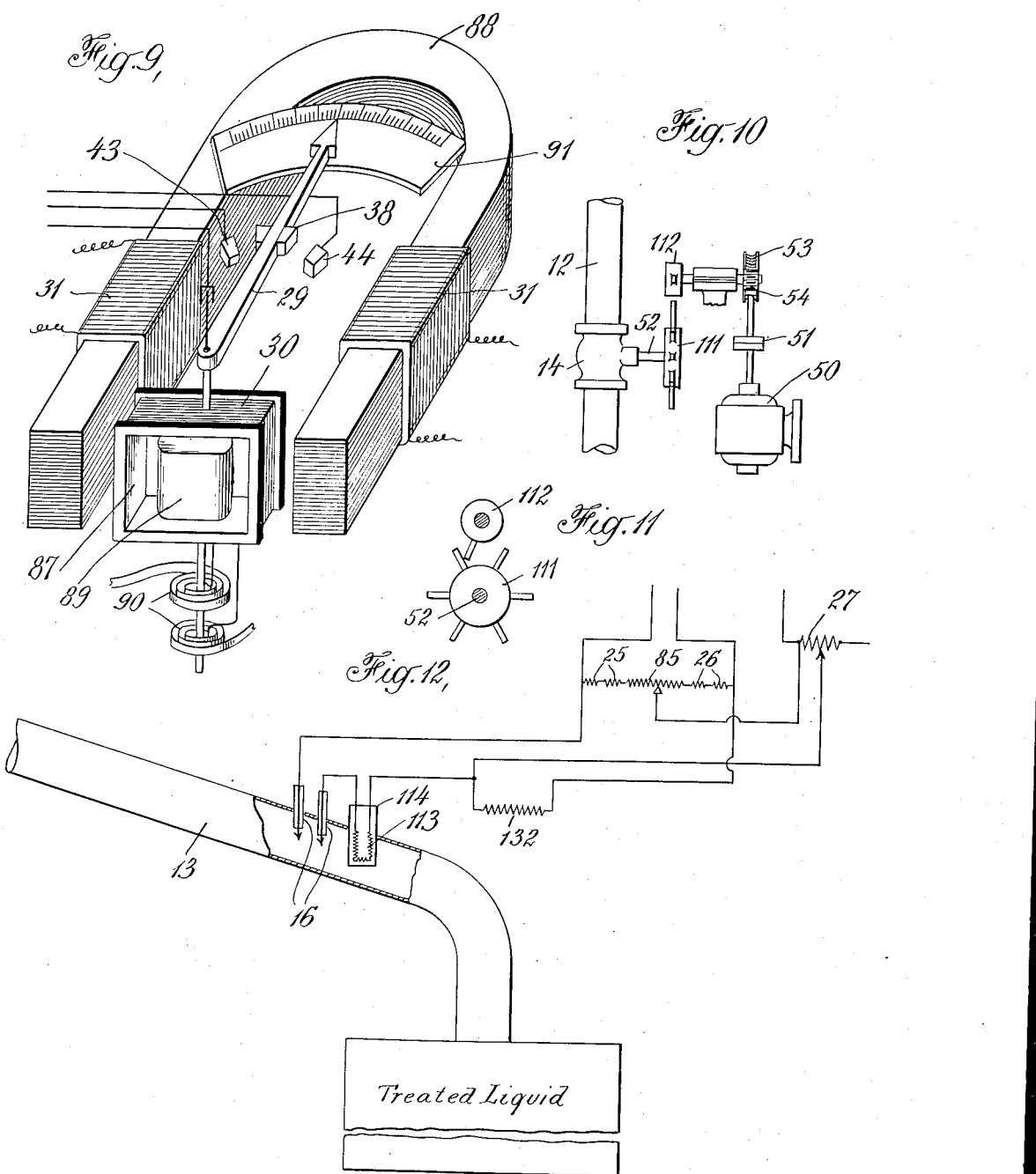

Mar. 27, 1923.  1,450,023
P. E. EDELMAN
AUTOMATIC CONTROL OF REACTIONS
Filed Dec. 13, 1919   5 sheets-sheet 5

Inventor
Philip E. Edelman
By his Attorneys
Rennie, Davis, Marvin & Edmonds

Patented Mar. 27, 1923.

1,450,023

UNITED STATES PATENT OFFICE.

PHILIP E. EDELMAN, OF NEW YORK, N. Y.

AUTOMATIC CONTROL OF REACTIONS.

Application filed December 13, 1919. Serial No. 344,756.

*To all whom it may concern:*

Be it known that I, PHILIP E. EDELMAN, a citizen of the United States, residing at New York city, in the county of New York, State of New York, have invented certain new and useful Improvements in Automatic Control of Reactions; and I do hereby declare the following to be a full, clear, and exact description of the invention, such as will enable others skilled in the art to which is appertains to make and use the same.

This invention relates to the automatic control of reactions, mixes, and the like. More particularly, the invention relates to the control of one or more reacting agents so as to obtain substantially constant or uniform effects from the action of the controlled agent or agents. The invention has for its general objects the provision of certain improvements in methods of controlling reactions, mixes, and the like, as well as an improved arrangement of apparatus for practicing the method of the invention.

In substantially all chemical industries and in practically all chemical processes, a predetermined desired change in the composition or properties of a material, or the formation of a predetermined desired product, is brought about by the chemical action of an appropriate reagent upon the material, or two or more reagents are mixed to form the desired new product. In any such case, it is desirable to control the uniformity of the reaction or of the end product. In some processes, there is involved only a physical mix of the ingredients in definite proportions, as, for example, of ore or sugar with water, and here also it is desirable to secure uniformity. Generally, the aim of the invention is to improve the reliability, accuracy, and practicability of control of processes of this class by providing continuous automatic correct mixing of the components thereof despite difficulties met with in practice.

The present invention thus involves the automatic control of reactions, mixes, and the like, in accordance with variations in the characteristics of one or more of the materials entering into the reaction (or mixture) or of the end product, and in its preferred form makes use of changes in the electrical conductivity of an appropriate component of the reaction, mix, or the like, or of the end product, with due regard to and compensation for undesired interfering characteristics of the material concerned, for automatically effecting the desired changes in the operations for securing and maintaining constant or uniform results.

A further object of the invention is the automatic control of a reaction or mixture regardless of the variations in the materials used therein so as to obtain a constant end product. Variations in the end product are caused to operate means to restore this constant result. A still further object of the invention is to make applications of the method to difficult commercial problems feasible by taking proper account of and compensating for variables met with to overcome interfering factors. Thus, where a mix has two or more concentrations or proportions having the same conductivity which will cause confusion and errors, improvements are introduced to secure correct reliable results despite this difficulty.

In many chemical and allied operations a change in the amount of reagent or reagents employed, or generally any change in the method of procedure, must be followed by an appreciable period of time before the desired effect or result is evidenced or reflected in the end product. Thus, for example, in the purification of water by the addition of milk of lime or calcium hydroxide, from a few seconds to several minutes, depending upon the local conditions, are required to notice any change in the result of the reaction after a change has been made in the amount of milk of lime employed. In automatically controlling the amount of reagent or reagents employed in order to secure a constant or uniform result, it is very desirable and necessary for accurate results to be able to take into account the period of time necessary for any change in the treatment to be noticed in the result. One of the objects of the present invention is, accordingly, to provide a predetermined time element or lag in the automatic control of a reaction so as to compensate for the period of time required for any change in the treatment to be reflected in the result. The preferred method of obtaining the necessary time element is to open the control circuits for an interval of time such that no further change in the adjustment will occur during the time required for the effect caused by the preceding change to affect the result, that is, the time required in the reaction or mixing is automatically taken into account. Necessary retarding of the control on this consideration is also accomplished by suitably retarding the action of the relays, motor, or valve travel, and where required dash pots or clockworks are utilized to insure the correct time interval.

In automatically controlling a reaction by changes in the electrical conductivity of the material being treated or of the end product, it frequently happens that the characteristic conductivity curve is of such a nature that it cannot be positively relied upon to secure the desired result. In such instances, the present invention contemplates the provision of auxiliary means, responsive to any variable characteristic of the reaction, mixture or end product, for insuring the desired action of the principal controlling means. For example, in the production of sulfuric acid of the commercial concentration of 65° Bé., it is customary to dilute a concentrated acid of approximately 68° Bé. with a relatively weak acid until the desired concentration of 65° Bé. is reached. The electrical conductivity of sulfuric acid in the neighborhood of 65° Bé. decreases when the concentration is both increased or decreased, and for this reason it is unsafe to premise the automatic control of the reaction upon changes in the electrical conductivity alone. Therefore, in accordance with the present invention, the automatic control of the reaction in response to changes in the electrical conductivity of the end product is supplemented, as, for example, by an auxiliary control in response to changes in the specific gravity of the end product as indicated by a system of balanced hydrometers. In this manner, the hydrometer control insures the action of the electrical conductivity control on the desired part of the characteristic conductivity curve of the reaction.

It makes no difference what the characteristic curve may be because the apparatus is adjusted to work on a change from a particular point thereon set for. On steep portions of curves having a large slope, more sensitive control is feasible than on flatter portions and where the curve of conductivity with respect to the condition obtaining in the mix is such that only slight electrical changes occur gradually over a wide range, I convert the curve to a steeper working portion by suitable dilution with water continuously, so that sharp control is made practicable even on such problems.

I prefer to use an alternating current supply and arrange the circuits in proper phase relation for correct results. By use of transformers I secure any required potential for operation and also insulate the several parts of the circuits to avoid interferences therebetween. The alternating current minimizes polarization effects. It also permits poor conductors such as gases to be controlled, as a small step up transformer can be used to secure the necessary high potential therefor.

Variations in temperature have a very pronounced effect upon the electrical conductivity of liquids, and, in general, the conductivity increases with increase in temperature. In the automatic control of reactions in response to changes in the electrical conductivity of liquids, accurate and satisfactory results can only be secured when some effective temperature compensating means is employed. A convenient means of securing the desired temperature compensation is to balance the portion of the material under test against a portion of similar material of known conductivity and maintained at the same temperature as the material being tested. The natural temperature of the material in process or undergoing treatment is usually subject to continual thermic changes, as a result of the heat of the reaction or of other causes, and owing to the time required to effect equalization or equilibrium of the temperatures of two bodies, a temperature compensating element influenced directly and only by the fluctuating temperature of the process may not be able to keep up therewith and becomes in such case unreliable. Moreover, in some applications, temperature changes temporarily alter the nature of the mix so that erroneous results are likely to result where the temperature compensator is operated under such changeable thermic influence as is provided by the temperature of the varying process. Furthermore, the temperature coefficient of a reagent is not usually constant, but varies with the temperature range at which it is worked so that a greater electrical change due to temperature may result at one condition of the mix or end product than at another. Accordingly, it is my prefered practice to place a sample portion (of the material whose electrical conductivity is to be measured or compared with that of a standard portion) under a definite temperature condition to avoid such errors as might result from the natural fluctuating temperatures of the process.

It frequently is impracticable to employ in the standard or balancing device material of the same composition as that under test. For example, in the treatment of milk and similar fermentable liquors, it is not practicable to use milk in the balancing or standard device. As another example, may be mentioned reagents such as some acids which dissolve impurities from the container and become unstable as a test portion. In accordance with my present invention, I propose to simulate the characteristics of the material under test by a different material of substantially stable character. In other words, I provide, in the balancing or standard device, a substitute for the standard of the material to be tested, which substitute substantially conforms in its conductivity and temperature coefficient with the material to be tested. For this purpose, I have found a number of stable alkaline and salt solutions suitable. Thus, I have found a five per cent solution of sodium hydroxide a very satisfactory average electrolyte conforming substantially in its temperature coefficient of conductivity to a large number of liquids. Evaporation of the sodium hydroxide solution in the standard or balancing device may be prevented by a layer of oil on the top of the solution.

I find that a majority of liquids have an average temperature coefficient of electrical conductivity of about .02. An aqueous solution of sodium hydroxide, however, has a range of temperature coefficients according to its dilution (or concentration), so that it may be used in proper strength to correctly imitate most other liquids or mixes as regards change of conductivity with change of temperature. The following table indicates the relation between concentration of sodium hydroxide solutions and the electrical temperature coefficient corresponding thereto:

| Concentration NaOH solution. | Change in electrical conductivity per change of degree C. in temperature. |
|---|---|
| 2.5% | 0.0194 |
| 5 | 0.201 |
| 10 | 0.217 |
| 15 | .0249 |
| 20 | .0299 |
| 25 | .0368 |
| 30 | .0450 |
| 35 | .0551 |
| 40 | .0648 |
| 42 | .0691 |

I prefer to make the standard or balancing element adjustable, and I have found that this result may be advantageously secured by dividing this element into two or more sections adapted for adjustment to any desired electrical temperature coefficient. Thus, for example, I may include in one section a liquid or equivalent material subject to thermic changes, and electrically in series and parallel therewith I may place a manganin wire resistance section. By appropriate adjustment of this combination any desired resistance having any desired temperature coefficient can be obtained as required. By means of these improvements a number of problems can be solved for the first time, such, for example, as the control of unstable and poisonous materials.

The conductivity with interfering factors taken care of, as herein set forth, is a reliable and sensitive indication of the condition of the mix. Often traces which no chemical test will detect are sufficient by their small variations to actuate corrective automatic controls as herein set forth.

Where the mix has a small temperature coefficient or the process is carried out at a constant temperature, a metal resistance test portion of manganin wire having substantially zero coefficient may be used. This is the case on some batch work where the mix is operated at the boiling point of water. In such case the control is applied to shut off the treatment when a definite electrical condition is reached by the end product.

As indicative of the many uses of the invention, I enumerate below various applications of the invention and instances or processes in which the automatic control of the invention may be employed with advantage:—

Maintenance of a standard product from a variable supply; for example, 28% acetic acid.

Automatic preparation of bi-sulphite liquors in the paper industry, so that there results an excess of neither sulphur dioxide or lime;

Control of oil, acid and water supply in the overflow froth resulting from the concentration of ores by the flotation process;

Control of the nitre supply steam inlet in the manufacture of sulphuric acid by the chamber process;

Control of free gas or halogens in liquids;

Maintenance of critical reaction conditions as bivalent or trivalent, such as bi and trisodium phosphate;

Maintenance of definite strength of solutions in electrolytic separation or refining;

Maintenance of definite acidity or alkalinity;

Reinforcing spent acids;

Working to a definite acidity or alkalinity;

Definite end point, slightly on acid or alkaline side. This application of the invention is more accurate than the best indicator heretofore available;

The automatic control may be employed, with advantage, in many instances where heretofore manual control has been necessary;

The automatic control of the invention may be employed in connection with acids, bases, salts, organic compounds, gases, absorption work (ammonia or sulphur dioxide) with either dilute or strong liquids with either good or poor conductors, although the control is usually less sensitive on poor conductors. The control can be used on continuous or intermittent or combination or batch work processes;

Control of the feed in a launder, or control of gas shutter valves, or shutter-valves on powdered mat;

Control of entrained solids or gases on a condensing system. For example, the control may be arranged to ring a bell and shut off a valve so that contaminated hot well water will not be used;

Control of wash water from filter press work;

Analytical repeat and quick determinations;

Control of wash water from any leaching process;

Control of crystallization liquors (strength acidity);

Control of water in compounds sold as certain % paste, such, for example, as 50% paste of lead arsenate;

Control of completion of chemical reactions;

Control of water treatment for softening purposes;

Control of density of feeds in metallurgical work, such as flotation work;

Control of overflow in thickeners;

Control of mixture of two liquids, such as two acids;

End point work, such, for example, as in manufacturing lithopone, diazo reactions, neutralizing residual alkalinity from lime soda water softening process;

Control of concentration of coffee in making soluble coffee extract;

Indication or automatic maintenance of correct reactions in a process or part of a process, so as to obtain definite results, like crystallization;

Exact mixes of reagents;

Correct treatment of sewage or factory waste.

Acid reclaiming or acid recovery;

Grinding operations, such as wet grinding of paint;

Manufacture of sulphate of alumina from bauxite with control on acid line;

Sugar manufacture, liming, $CO_2$, $SO_2$ density; regulate density from evaporating pans;

Completion of distillation in the preparation of camphor, tanning bark, quinine, etc.; shut off of heat supply and dumping of batch;

Automatic preparation of chemicals by the addition of new reagents when certain reactions are complete;

Autoclave work to determine completion of chemical reactions;

Concentration of evaporation process results;

Determination of waste in tailings or wash waters;

Indication of the penetration of size in paper;

Holding acid content of a distillate at a definite point;

Control of $97\frac{1}{2}$ to 100% sulfuric acid;

Maintenance of photographic reagents at a desired standard during their manufacture;

Maintenance of photograph reagents at a desired standard during their use, as in the developing of motion picture films;

Control of the density of rubber latex;

Control of weak acid treatment of raw rubber juices to take the place of smoking;

Control of the preparation of soft drinks, like grape juice, bevo, $2\frac{3}{4}$% beer, moxie, coca cola, etc.

Control of the manufacture of printing inks;

Control of the manufacture of extracts, like vanilla;

Maple sugar, vinegar and similar mixes;

Control of the percentage of benzoate of soda up to certain limits used as a preservative;

Causticizing and making milk of lime to definite strengths;

Determination of boiler scale and as a control in gold dredging;

Neutralizing original alkalinity in salt brine before electrolysis;

Maintaining a definite saturated brine content before electrolysis;

Automatic preparation of fuming acids with definite percentage of free gas;

Preparation of organic compounds, such as sugar, candy, etc.

Concentration of soups;

Maintaining definite lye contents in lye peeling of fruits;

Concentration of beef extracts;

Manufacture of corn products where the materials are treated with acids;

Manufacture of patent medicines, lotions, and mixtures;

Manufacture of pure food gelatine where the sulphur dioxide must not exceed a certain per cent (treatment of molasses).

Dehairing hides;

Manufacture of glue (right amount of line);

Maintenance of baths up to definite strengths, such as all dyeing operations, or maintaining definite acidity or alkalinity, or weighting of silks with tin chloride in which case the controller is used to keep the tin chloride up to strength; also electroplating baths;

Blast furnace work, to maintain definite flux and also any other furnace work;

Solvay process, control of different liquids (to obtain better standard, like soda ash in disodium prosphate);

Water control, liming water for sulphur mine work or laundry work;

Control of densities, such as sugar work;

Acid phosphate manufacture; control of definite Baumé of sulphuric acid, or control of phosphoric acid in its manufacture;

Control of chemicking, souring and washing of wool, cotton, and other fabrics;

Bleaching operations;

Water treatment; for example, addition of sodium bi-carbonate to permit treatment by alum or another reagent which might form and precipitate;

Continuous indication on chart, to indicate accidents such as leaks;

Carbonation control for beet sugar work;

Mixing acids;

Soapmaking, testing, controlling amount of free alkali;

Glycerine recovery (old method) controlling amount of lye;

Dyestuffs; end points;

Preparation of storage battery electrolytes;

Tanning, preparing tobacco, making felt hats, nitric acid and lime treatment;

In the concentration of ores by the flotation process, the following possible control arrangements may be employed:

| Factor controllable. | Controller. |
|---|---|
| Water supply: | Ore supply or other variable ore moisture. |
| percentage. | |
| percentage. | |
| Acid. | Acidity of floater. |
| Oil. | Water variations. |
| | Ore. |
| Water treatment. | Water variations. |
| Speed of ore feed. | Mixture variation. |
| Speed of mixers. | Mixture variation. |
| Any factor. | Gangue residue. |
| Any stage. | Variation in product of that stage. |
| Plural control. | One or two or more factors. |
| Froth (density). | Regulation by correct addition of water in process. |

The field of application of the inventiton is thus not only in the manufacture of chemicals, but also in the use of acids, such as in the paper industry, mixing acids for ore work, maintaining solutions in cyanide work, etc. The automatic control of the invention maintains a certain result; for instance, in liming if a pipe clogs the valve will open further.

The foregoing and other objects of the invention will be more particularly described in and better understood from the following description taken in conjunction with the accompanying drawings in which;

Fig. 1 diagrammatically illustrates an automatic reaction control equipment embodying the principal features of the invention;

Fig. 2 is a sectional elevation of an improved form of standard cell;

Figs. 3, 4 and 17 are diagrammatic views illustrating certain modifications of the combined hydrometer and electrical conductivity control;

Fig. 5 is a detail view illustrating the application of the valve control device to a standard type of hand or wheel valve;

Fig. 9 is a diagrammatic view of an alternating current ammeter or galvanometer adapted for indicating unbalancing of the Wheatstone bridge;

Figs. 10 and 11 are detail views illustrating a modified mechanical connection between the driving motor and the valve to be controlled;

Fig. 12 illustrates an arrangement in which temperature compensation is attained by inserting a wire resistance element having a positive temperature coefficient in series with the testing electrodes to oppose the negative temperature coefficient of the material between the electrodes;

Figure 13:
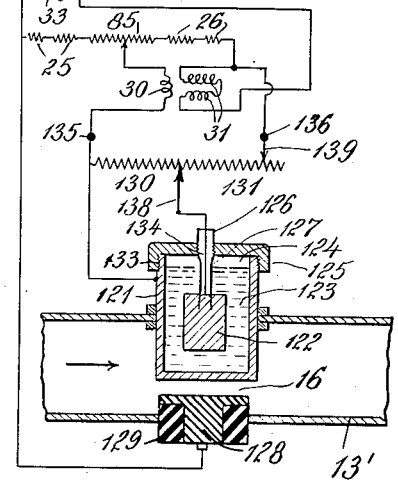
Figure 14:
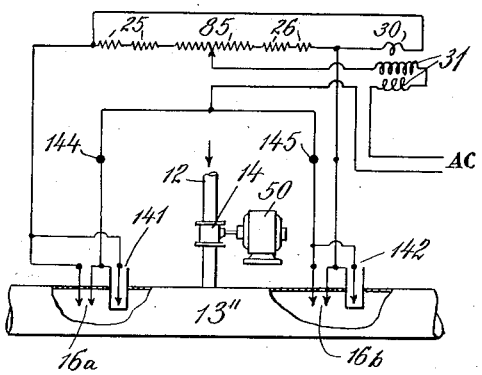
Figure 15:
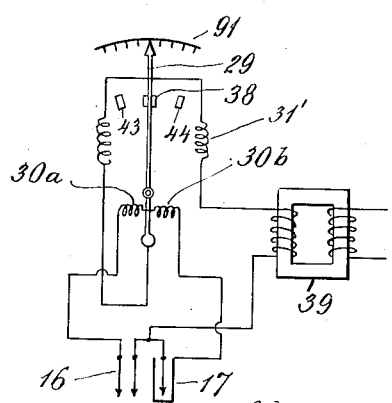
Figure 16:
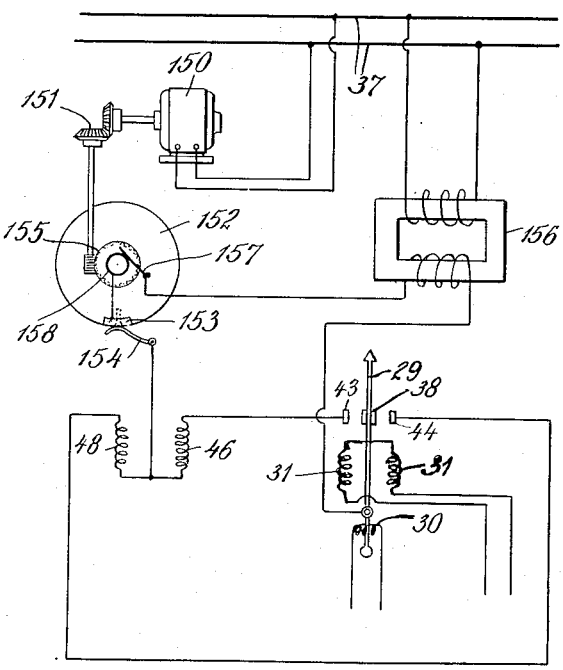

Fig. 13 diagrammatically illustrates an adjustable embodiment of the temperature compensator;

Fig. 14 diagrammatically illustrates a modification of the invention by which chemical factors not desired may be balanced out;

Fig. 15 diagrammatically illustrates an embodiment of the invention in which a differential galvanometer is used; and Fig. 16 diagrammatically illustrates a modified arrangement for securing the desired time elementing of the apparatus of the invention.

Referring particularly to Fig. 1 of the drawings, there is diagrammatically represented a storage or other container 10 for the raw material to be treated, for example, water to be purified. A container 11 for an appropriate reagent is connected by a pipe 12 with the discharge conduit 13 of the container 10. Assuming that the reaction contemplates the purification of water, the container 11 may contain milk of lime or other appropriate reagent. A valve 14, automatically controlled as hereinafter explained, is included in the pipe 12. The reagent mixes with the raw liquor in the conduit 13 and flows into the receptacle 15 for the treated liquid.

The reaction between the reagent and the raw liquor produces a definite change in the electrical conductivity of the raw liquor, and when the desired change has been brought about the electrical conductivity of the treated liquid is of a predetermined value. Any fluctuation of the conductivity of the treated liquid from this predeterminable value indicates non-uniformity in the treatment, and in accordance with the invention such fluctuations are by proper compensation for interfering factors, caused to produce appropriate modifications in the treatment operation to secure the desired constant or uniform result.

The fluctuations in the conductivity of the treated liquid, or other material, may be measured and employed in various ways for effecting the desired control of the treatment or composition of the end product. For example, in an end point reaction the apparatus can be adjusted to work on either the base or acid side of the end point. In Fig. 1 of the drawings, I have illustrated a testing receptacle 28 which is maintained filled with liquid from the conduit 13 by means of an inlet funnel 32 and a drip cock 32' fitted in the conduit 13. The drip or outlet cock 32' is positioned at such a point in the conduit 13 that the reaction between (or mixture of) the raw liquor and the reagent is completed when the mixture reaches the cock. A stream of liquid is thus tapped from the conduit 13 and flows through the testing receptacle 28 into the receptacle 15 for the treated liquid. The testing receptacle 28 may be electrically insulated from the conduit 13 by proportioning the drip cock 32' so that the liquid tapped from the conduit 13 falls in individual and separate drops into the inlet funnel 32. The testing receptacle 28 is surrounded by a fluid-containing jacket 28', in which there is circulated a fluid 137 maintained at a practically uniform temperature. This circulating fluid acts as a thermic medium for maintaining the testing and standard electrodes, as hereinafter more particularly described, at substantially the same temperature, thus rendering the operation of my improved equipment independent of temperature variations. It is thus also possible to work on problems where electrodes could not be conveniently or practically inserted direct in the mix in the process.

A pair of testing electrodes 16 project into the receptacle 28. A standard or balancing set of electrodes 17 is also mounted in the receptacle 28 in proximity to the electrodes 16. In Fig. 2 of the drawings there is illustrated a convenient and advantageous form of standard or balancing device. As illustrated in this figure the device comprises a casing 18 containing an electrolyte 19 conforming in its temperature coefficient of conductivity to the treated liquid. In general, I have found a five per cent solution of sodium hydroxide a very satisfactory average electrolyte for many applications of the invention. Other solutions are also satisfactory, as, for example, a saturated solution of calcium hydroxide and in general any stable liquid having the temperature characteristic of the test portion. Electrodes 20 are immersed in the electrolyte 19 and are secured to insulated conductive leads 21 extending through the cover 22 of the casing. A filling and vent tube 23 is mounted in the cover 22. Preferably a layer of oil 24 floats on top of the electrolyte 19 to prevent evaporation of the latter.

The electrodes 16 and 20 may be made of any convenient form, such as round rod electrodes, flat plates or disks, spherical or of the well-known spark plug type. The effective surface of the electrodes should be well below the liquid level so that the electrodes are not affected by the level of the liquid. The insulating stem or leading-in conductor of the electrodes can be effectively insulated by coating with rubber. This coating with rubber need not be a water-tight joint, but just enough so that there is a layer of rubber between the electrodes. For example, where round carbon rods are used and it is desired to expose about 1 inch of the lower end of each rod, ordinary rubber tubing may be slipped over the rest of the rod, thereby giving a satisfactorily tight joint and providing sufficient insulation.

As little current as possible should be used in the circuit including the material between the testing electrodes 16, so as to minimize heating, polarization, deposit, and gas effects to a negligible extent. As little as 5 milli-amperes and rarely over 100 milli-amperes may be used. It is important not to use heavy currents.

Conductivity is the reciprocal of resistivity, so that if the material between the testing electrodes 16 has 10 ohms resistance at 18° C., its conductance between the testing electrodes 16 is one-tenth of a reciprocal ohm. From Ohm's law $\left(I=\frac{E}{R}\right)$, it is thus obvious that the applied voltage must be higher in the case of poor conductors. For most acids, alkalies and salts, 12 volts or less applied to the bridge from a small current source suffices. Ordinary tap water varies in resistance, so that with electrodes one centimeter apart and one square centimeter in area, this resistance may be 1000 ohms for hard water up to 12,000 ohms for distilled water. The addition of water to a mix usually, but not always, increases the resistance. There are many exceptions where water addition decreases the resistance. This is due to the condition of dissociation of the ions concerned, so that for any case it is important to note what effect is caused by changes of the proportion of the mix, so that proper adjustment may be made to add or subtract parts thereof, as required.

The testing electrodes 16 and the terminals of the balancing device 17 are preferably connected according to Fig. 1 as two arms of a Wheatstone bridge in which the other two arms comprise resistances 25 and 26. As illustrated in Fig. 1 of the drawings, the resistances 25 and 26 comprise a plurality of units (preferably calibrated) which may be cut in and out, as desired. These two resistance arms of the bridge are connected by an intermediate resistance 85 having an adjustable contact 86 connected to the source of electric energy from which the bridge is energized. The bridge is energized from an adjustable resistance potentiometer 27, and the balanced or unbalanced condition of the bridge is indicated by the moving element or pointer 29 of an appropriate electrical measuring instrument, such, for example, as a galvanometer, an ammeter, a contact making voltmeter, or the like.

In Fig. 1 of the drawings, I have represented an alternating current ammeter for indicating unbalancing of the Wheatstone bridge arrangement. The construction of this instrument is more clearly shown in Fig. 9 of the drawings. The ammeter has a moving coil 30 to which the pointer or moving element 29 is secured. The coil 30 is wound on an aluminum shell 87 and is pivotally mounted between the poles of a laminated U-shaped magnetic member 88. The shell 87 accordingly acts as a magnetic damper opposing any sudden transient fluctations of the moving coil as may be caused by temporary changes of voltage, air bubbles in the mix, etc. It is important to have magnetic or other suitable damping means to prevent premature closing of the control circuits by transient fluctations. If desired, the strength of the field in which the moving coil 30 is mounted may be increased by arranging a stationary magnetic core 89 within the aluminum shell 87. The laminated magnetic member 88 is energized by a pair of field coils 31. In the specific arrangement of electrical connections illustrated in Fig. 1 of the drawings, the field coils 31 are connected in series with the potentiometer 27. The moving coil 30 of the ammeter is connected to the Wheatstone bridge, to indicate unbalancing thereof in the usual manner, and to this end the moving element of the ammeter has a pair of opposed coil springs 90, serving as terminals thereof, as will be well understood by those skilled in the electrical instrument art. The sensitivity of this alternating current galvanometer may be adjusted by increasing or decreasing the current flowing through the field coils 31. In practice, I find a suitable adjustment to be one such that 0.1 milli-ampere will effect such a movement of the coil 30 as to cause the contact 38 to travel from one contact 43 to the other 44.

It will be noted that in the particular arrangement of connections illustrated in Fig. 1 of the drawings, the ammeter field coils 31 and the potentiometer 27 are connected in series and across the terminals of the secondary winding 33 of a transformer 34. The primary winding 35 of this transformer is connected by a solenoid-operated switch 36 to alternating current supply mains 37.

The moving element or pointer 29 of the ammeter may, if desired, sweep across an appropriate scale 91. The scale 91 may, if desired, be appropriately calibrated in terms or units of any desired characteristic concerned with the condition of the material in the conduit 13, such, for example, as percentage acidity, alkalinity, concentration, or the like. The moving element or pointer carries an electrical contact 38 which is electrically connected, for example, through the pivot bearing of the instrument and appropriate electrical conductors, to the secondary winding 39 of a transformer 40, whose primary winding 41 is connected to the secondary winding 33. A U-shaped yoke member 42, composed of suitable insulating material such as fibre, rubber, bakelite, or the like, carries two contacts 43 and 44 near the extremity of its arms and is pivoted at its base so that it may be turned about this pivot by means of a knob 45. The contacts 43 and 44 are arranged to cooperate with the contact 38, and the yoke member 42 may be turned about its pivot so as to secure any desired adjustment of the relative distances between the three contacts 38, 43 and 44. All circuits should be well insulated. The adjustable feature shown permits quick changes to be made in the terminal product at will, by the turning of a single knob 45.

The contact 43, Fig. 1, is connected to one terminal of the energizing coil 46 of a solenoid-operated or electro-magnetic switch 47, and the contact 44 is connected to one terminal of the energizing coil 48 of a second solenoid-operated or electro-magnetic switch 49. The other terminals of the energizing coils 46 and 48 are connected together and to the secondary winding 39 of the transformer 40.

The switches 47 and 49 are connected to the terminals of a series electric motor 50. The rotor of this motor is connected through a slip-clutch 51 to the operating stem 52 of the valve 14, through appropriate gear reduction comprising a worm gear 53 secured to the stem 52 and a cooperating worm 54 driven by the electric motor. The armature and field windings of the motor 50 are so connected to the contacts of the switches 47 and 49 that the rotor of the motor revolves in one direction when switch 47 is closed and in the opposite direction when switch 49 is closed.

In an electrical contact making device of the general type employed in carrying out my present invention, difficulty is frequently encountered in sticking of the contacts. One of the objects of the invention is to provide appropriate means for overcoming such defects in instruments of this type. In accordance with the invention, the contact making device is subjected to an appropriate degree of vibration whenever the contacts of the device are made. Thus, it will be seen by reference to Fig. 1 of the drawings that whenever either of the electromagnetic switches 47 and 49 are energized, a spring actuated contact 55 is biased to engagement with a stationary contact 56, thereupon energizing the coil 57 of a make-and-break device of the well known buzzer type. This make-and-break device may be mounted on the back of the contact making device and the movement of the vibrating element 58 is sufficient to produce the desired gentle jarring of the contacts 38 and 43, or 38 and 44, when in engagement, to prevent sticking of these contacts, these contacts are worked at very small current density so that injurious sparking is avoided. Any number of relays may thus be controlled with a very small initial current through contacts 38, 43 and 44.

The desired time element, for permitting any change in the treatment to effect a corresponding change in the result, is brought about in the arrangement illustrated in Fig. 1 of the accompanying drawings by periodically opening the main switch 36 during the periods that either of the switches 47 or 49 is closed. Thus, assuming, for the purposes of example, that ten seconds are required for any change in the amount of reagent supplied from the container 11 before the galvanometer or other contact making instrument will show a corresponding change in conductivity of the material between the electrodes 16, appropriate instrumentalities are provided for opening the main switch 36 for a period of about ten seconds during such times as either of the switches 47 or 49 is closed. To this end the switch 36 has a coil 59, which, when energized, quickly opens the circuit. This switch is provided with damping means, such, for example, as a dash pot 60, so that substantially ten seconds will elapse before the switch 36 returns to its circuit-closing position. It will thus be understood that the switch 36 is lagged or damped in only one direction, to wit: in moving to its circuit-closing position, and it will be understood that the amount of damping or lagging may be adjusted to suit operating conditions.

The energizing coil 59 of the switch 36 is controlled by a pair of contacts 61 adapted to be bridged by the moving element 62 of a relay having an energizing coil 63. The coil 63 is connected so that it is energized whenever either pair of the cooperating contacts 55 and 56 are in engagement. The moving element 62 is provided with damping or lagging means, such, for example, as a dash pot 64, which is so designed that a definite time interval expires after the coil 63 is energized before the contacts 61 are bridged. The lagging or damping of the element 62 is adjustable, and in practice is determined by the length of time required to produce an appreciable change in the setting of the valve 14. For example, in the case which I have above assumed, a time-lag of ten seconds will, in most cases, be found satisfactory. The moving element 62 is preferably lagged or damped in only one direction, to wit, when moving towards its circuit-closing position.

By using a clockwork or other appropriate time-keeping mechanism provided with a circuit closing device (time-switch), any desired time can be automatically taken account of, even long periods, such as are encountered in the case of very slow reactions. The clockwork, as is obvious, is substituted for the dash pot mechanism set forth, to open and close the switches at correct time intervals.

Compensation for the time interval required for any change in treatment to be evidenced at the contacts 16 may frequently be satisfactorily accomplished by providing a very considerable gear reduction between the rotor of the motor 50 and the stem 52 of the valve 14. By making this gear reduction sufficiently great, the movement of the valve stem can be reduced to a very small amount per unit of time, whereby the change in treatment becomes a very small increment with respect to time, so that only a very slight change in the treatment takes place during the time interval necessary for any change to be evidenced at the point of testing. Where the time interval necessary for any change in treatment to be reflected at the point of testing is of relatively short duration, for example, of one minute or less, a considerable gear reduction between the valve and the controlling motor will frequently be found sufficient compensation for all practical purposes.

As diagrammatically represented in Fig. 13 of the drawings, the temperature compensator comprises three sections, one of which consists of a brass, iron, or other appropriate metallic cup 121, electrode 122 and an appropriate liquid such as saturated lime water 123. This section or unit of the compensator is inserted into the supply launder or conduit 13' through which the material to be tested flows. The other two sections or units of the compensator comprise external wire resistances 130 and 131 of suitable material, such, for example, as manganin wire. The metallic cup 121 and centrally disposed electrode 122 form the cooperating electrodes of the standard or balancing element.

A cap 125 is tightly screwed to the cup 121, and the latter is filled, except for a small space at the top, with an appropriate electrolyte 123. No vents need be provided, since a minute alternating current has been found to produce no harmful gas accumulation. The cap 125 carries an insulating plug 126 to which is secured the metal electrode 122 by means of a mica, porcelain or other appropriate insulating member 127. A terminal or leading-in wire 134 is connected to the electrode 122 and is brought out through the member 127 and plug 126.

The electrolyte 123 has a definite stable temperature coefficient, and preferably this is as high as any condition to be adjusted for in the test mix in the conduit 13′ is likely to have, as ascertained by trial. Assuming that the material passing through the conduit 13′ has an unknown temperature cofficient $x$, then in accordance with the formula for resistance $$R = K\frac{L}{A}(1 + xt)$$

where R is the resistance between the testing electrodes (16), L the length and A the area of the test section between these electrodes, $t$ the temperature change and $x$ the change of resistance per unit temperature change. The quantity $x$ is, of course, usually negative for liquids, as an increase in the temperature usually causes a decrease of resistance.

Referring again to Fig. 13 of the drawings, it will be observed that the manganin resistance element 130 is connected in parallel with the electrodes 121—122, while the manganin resistance unit 131 is connected in series with these electrodes, so that by moving the adjustable contacts 138 and 139 a proper balance may be maintained on the bridge 25—85—26 as usual, while only the coefficient $x$ of the combined adjustable test element having terminals 135 and 136 is thus varied.

For example, if the electrolyte 123 is made so that it offers a resistance of 30 ohms and the resistance element 130 is made to have a value of 30 ohms to reduce the effective temperature coefficient ($x$) thereof, then the resistance unit 131 has to have 15 ohms to both bring the value back to 30 ohms and assist resistance unit 130 in reducing the temperature coefficient ($x$) to the proper value for the condition desired. The combined test section or element with its terminals 135—136 can thus be made to have any desired temperature coefficient ($x$) equal to or less than that of the electrolyte 123, which latter may be a suitable sodium hydroxide solution. The balancing or compensating element having terminals 135—136 can thus be made, by trial, to duplicate the unknown value ($x$) of the temperature coefficient of the material flowing through the conduit 13′.

An electrode 128 is introduced into the conduit 13′ by means of an insulating bushing 129 and cooperates with the cup 121 to form the testing electrodes (16). In other respects, the arrangement of Fig. 13 is substantially the same as that of Fig. 1, and similar elements in the two arrangements are designated by the same reference characters. By the arrangement represented in Fig. 13 of the drawings, a stable fixed compensator independent of the changing character of the material flowing in the conduit 13′ is secured, so that for any such material, temperature does not affect the action of the contact-making instrument. Since the bridge arms 25—85—26 have a definite ratio, this is a constant for a given adjustment so that the electrical change caused by temperature is balanced out. Thus, the resistances, as represented by the reference characters herein employed to designate the same, stand in the following ratio to one another:

$$\frac{25-85}{121-128} = \frac{26-85}{135-136}$$

so that temperature change multiplies both sides of this equation leaving the same net result. In the foregoing formula for resistance, K is a constant for the compensating section 135—136, but not for the electrode test section 121—128. Hence, as the material in the conduit 13′ fluctuates, the value of K over the electrode test section 121—128 alters and affects the action of the galvanometer, which then causes further units of this material to be suitably modified as hereinbefore described. The reason why it is desired to have such an adjustable temperature compensator is that the material flowing through the conduit 13′ itself may have different temperature coefficients according to the concentration it is set for as the value of its temperature coefficient may vary widely at several different adjustments for different resulting end products which may be desired at will.

In certain operations, it is desirable to provide a double control for insuring the operation of the conductivity responsive control at the proper points on the characteristic conductivity curve in hand. Thus, for example, in the manufacture of sulfuric acid of a commercial concentration of 65° Bé., it is customary to mix concentrated acid with dilute acid to obtain the standard concentration. Around 65° Bé., the characteristic conductivity curve of sulfuric acid is more or less unreliable for the purposes of the invention, because the conductivity decreases when the concentration is either increased or decreased. In accordance with this aspect of the present invention, I provide an ancillary or auxiliary control device which may, in many cases, advantageously respond to predetermined changes in the concentration or specific gravity of the material being treated, such, for example, as in the manufacture of sulfuric acid of a desired concentration.

In Fig. 1 of the accompanying drawings, I have illustrated a hydrometer balance arranged to operate as an auxiliary control of the switches 47 and 49, and hence of the controlled valve 14. The hydrometer balance comprises a standard hydrometer 67 and a testing hydrometer 68 operatively mounted in a testing chamber 69 having an inlet pipe 70 and an outlet pipe 71, whereby there is maintained in the chamber 69 a constant circulation of the material flowing in the lower end of the conduit 13. The hydrometer 68 thus responds to variations in the specific gravity of the material in the chamber 69, while the hydrometer 67 is enclosed in a case 72 containing a liquid of known or standard specific gravity. The two hydrometers are operatively secured to a horizontally disposed arm pivotally connected at 73 to a bracket 74 mounted on the chamber 69.

The hydrometer balance is provided with a movable contact 75 adapted to engage fixed contacts 76 and 77. The contact 75 is thereby adapted to engage with either the contact 76 or 77 and to thereby energize, from the secondary winding 78 of a transformer 79 having its primary winding connected to the supply mains 37', either the coil 48 or the coil 46 of the solenoid-operated switches 49 and 47, respectively. Two switches 84 and 84' are provided in the circuits of the primary and secondary windings, respectively, of the transformer 79 so that the hydrometer balance control may be cut out and thereby rendered inoperative when its use in the apparatus is not desired, as, for example, when preparing a 52° Bé. sulfuric acid mixture.

Considering the production of sulfuric acid of a concentration of 65° Bé., the hydrometer balance will be arranged so as to move the valve stem 52 in one direction if the specific gravity of the acid in the chamber 69 reaches 63° Bé. and to move the valve stem 52 in the other direction if the concentration of the acid in the chamber 69 rises slightly above 65° Bé. The hydrometer balance thus secures a rough adjustment in the control and insures the operation of the conductivity control equipment on the portion of the characteristic conductivity curve between 63° and about 65° Bé.

Instead of connecting the hydrometer balance so that it operates upon the switches 47 and 49, it will in some cases be preferable to connect this balance to auxiliary valves, so that when the specific gravity falls to 63° Bé., a valve controlling the flow of weak acid will be closed and when the concentration slightly exceeds 65° Bé., a valve controlling the flow of the concentrated acid will be closed. Such an arrangement is illustrated in Fig. 3 of the drawings, in which there is represented a valve 65 normally held in an open position by a spring 80 for controlling the weak acid supply pipe. A similar valve 66 is included in the supply pipe for the concentrated acid and is similarly held in an open position by a spring 81. The hydrometer balance and other elements of the equipment co-operating therewith are arranged substantially as in Fig. 1 of the drawings, and similar parts are represented by the same reference characters in the two figures.

The valve 65 is closed upon the energization of a solenoid 82, and similarly the valve 65 is closed upon the energization of a solenoid 83. The valves 65 and 66 are normally held open by the action of the springs 80 and 81. Assuming that the control equipment is arranged for the manufacture of commercial sulfuric acid of a concentration of 65° Bé. and that weak acid is fed from the container 10 and concentrated acid from the container 11, then when the specific gravity of the mixture, as it flows through the lower end of the conduit 13 falls below a predetermined value, the movable contact 75 of the hydrometer balance will engage the fixed contact 76, thereby energizing the solenoid 82 and closing the valve 65 of the supply pipe from the container for the dilute acid. When the specific gravity of the mixture has been restored to the desired extent the contacts 75 and 76 will be separated and the valve 65 opened by the action of the spring 80. On the other hand, if the specific gravity of the mixture rises above a predtermined value the movable contact 75 of the hydrometer balance will engage the stationary contact 77, thereby energizing the solenoid 83, which thereupon operates to close the valve 66 and thus shuts off the supply of concentrated acid.

As hereinbefore stated, the hydrometer balance cooperates with an ancillary or auxiliary instrumentality for effecting a more or less rough control of the final product, and the finer and more delicate control is effected by the fluctuations in the electrical conductivity of the final product, as hereinbefore described. Under normal operating conditions the movable contact 75 of the hydrometer balance will occupy substantially its mid-position between the stationary contacts 76 and 77, and the valves 65 and 66 will be held open by their respective springs 80 and 81. It is only upon the occurrence of abnormal and unusual conditions that the hydrometer balance control is called into operation. A further modified arrangement of the combined hydrometer balance and electrical conductivity control is shown in Fig. 4 of the drawings. In the arrangement of this figure the hydrometer balance and the testing and standard electrodes are mounted in the receptacle 15' for the treated liquid. The movable contact element 75' of the hydrometer balance is connected to the hydrometers 67 and 68 by a linkage 94. In the arrangement of this figure, as well as in the arrangement of Fig. 3, the testing hydrometer 68 is surrounded by a perforated cylinder or shell 95 so as to shield the hydrometer from the effects of circulating currents in the liquid. The perforations in the shell 95 permit the free entrance of the liquid to be tested within the shell, so that the hydrometer is at all times influenced by the liquid to be tested. The testing electrodes 16 are inserted through the wall of the receptacle 15'. In the standard or balancing device the outer shell or casing 18' is made of electrical conducting material, and serves as one of the standard electrodes. An electrode 20' is mounted within the casing 18', which latter is filled with an appropriate electrolyte having a temperature coefficient of conductivity substantially conforming to that of the liquid under test. The casing 18' is connected to one of the electrodes 16, and the other electrical connections of the testing and balancing devices are made to effect the Wheatstone bridge arrangement as explained in connection with Fig. 1. Similar elements in Figs. 1 and 4 are indicated by the same reference characters.

Figure 6:
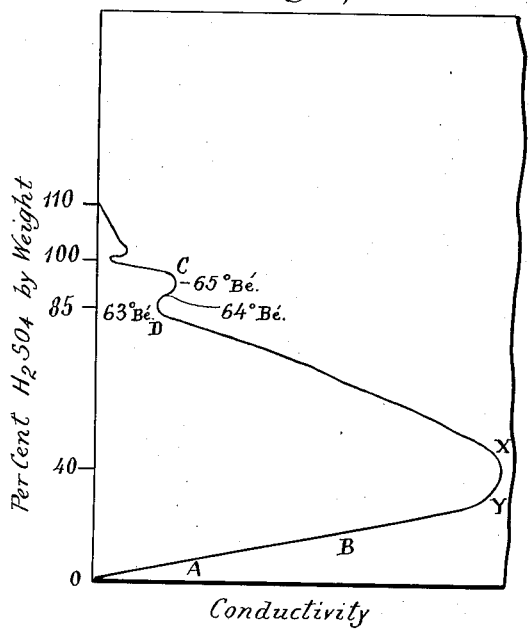
Fig. 6 illustrates the characteristic conductivity curve of sulfuric acid.

The characteristic conductivity curve of sulfuric acid is shown in Fig. 6 of the drawings. It will be noted that this curve is of the plural-humped type, and it will be observed that in the vicinity of 65° Bé., the electrical conductivity decreases when the concentration both increases and decreases. In the curve of Fig. 6, the ordinates represent percentage concentration by weight or the equivalent degrees Baumé while the abscissæ represent units of electrical conductivity. As previously explained, when manufacturing sulfuric acid of a standard concentration of 65° Bé., the hydrometer balance is adjusted so as to prevent the concentration of the product rising above 65° Bé., whereby the electrical conductivity control must operate on the lower part of the humped portion of the characteristic curve in the vicinity of 65° Bé.

On some applications, particularly those where a hydrometer does not show a working change reliably, I prefer to avoid humps in the characteristic curve concerned by working on either side thereof or by converting the doubtful values to another unmistakable portion of the curve. Thus, for example, though more suitable in other problems, in the case of sulfuric acid, I may automatically mix a large portion of water continuously with a small test portion of the end product acid, and on the basis of the definite diluted sample, get results free from humps as far as the operation of the apparatus is concerned. These converted results, however, can be directly used to modify the original concentrated mix. Thus, the range 63° Bé. to 65° Bé. can be converted to the range from 0.1° Bé. upwards, by suitable automatic addition of water to the continuously taken sample. Each small change in the original concentrated mix can thus be reliably converted to control the original mix on the basis of the conductivity of the diluted sample. An embodiment by way of example of this aspect of the invention is shown in Fig. 1 of the drawings, and may be placed in operation by opening the valve 116. The valve 116 is located in a pipe 115 communicating with a water supply receptacle 119 and the interior of the testing receptacle 28. The water in the receptacle 119 is maintained at a constant head by means of an appropriate float operated valve 120 co-operating with the water supply pipe 118. The outlet pipe 117 of the receptacle 28 has a two-way valve 121 whereby the diluted material from the receptacle 28 may be by-passed through the pipe 122, provided it is undesirable to run this diluted material into the receptacle 15.

With a constant head of water maintained in the receptacle 119 a definite number of parts of water, for example, 50 parts, may be continuously added to one part of the concentrated test sample of the material received in the receptacle 28 through the drip cock 32'. The testing electrodes 16 therefor operate on a more or less diluted electrolyte, derived from the main conduit 13 with appropriate dilution, and any change in the electrical conductivity of the test portion causes correct automatic operation of the main control valve 14 in the manner hereinbefore described.

Referring to Fig. 6 of the drawings, the range D—C (63° Bé. to 65° Bé) of the characteristic conductivity curve of sulfuric acid, can, by the arrangement hereinbefore described, be converted to a stable range, such as indicated between A and B of the curve of Fig. 6 which latter range is a continuous sharply inclined straight line. In many instances, an unsuitably flat portion of the characteristic conductivity curve, such, for example, as that between $x$—$y$ of the curve of Fig. 6, can similarly be converted for control purposes so that problems where the conductivity and density changes are very slow and gradual can be solved with greatly enhanced accuracy.

If desired, the drippings from the pipe 122 can be pumped back to the weak acid supply line, or these drippings may be thrown away, the loss being practically negligible since the test portions are very small. In some cases of slowly soluble materials, as, for instance, thick milk of lime, an appropriate reagent or solvent may be substituted for the water supply, as, for example, dilute acid. A material which ordinarily would give by itself no reliable conductivity or density change can, by the arrangement just described, be made to give ample unmistakable working variation for control purposes. It will, of course, be understood that this feature of the arrangement illustrated in Fig. 1 of the drawings may be dispensed with by merely closing the valve 116.

In Fig. 5 of the drawings the conduit or pipe 12' has a valve 14', of a well-known type, provided with an operating wheel or handle 96. A flexible shaft 97 is secured at one end, by means of a removable clamp 98, to the valve wheel 96. The shaft 97 has at its other end a rigid element 99 to which is secured a friction disk 100. The worm gear 53' is loosely mounted on the shaft element 99 and is pressed against the disk 100 by the action of a spring washer 101 positioned between two disk washers 102 and held on the shaft element 99 by a nut 103 A worm 54' meshes with the worm gear 53' and is operatively connected to the valve-controlling motor, as described in connection with Fig. 1 of the drawings. The worm makes the adjustment self-locking as the valve cannot turn against it. By this arrangement any ordinary type of valve may be operatively connected to the valve controlling motor contemplated by the present invention, without the necessity of providing special types of valves, or of disturbing the pipe lines already installed at the plant. This is of particular importance in applying the invention to existing equipments, and is moreover of especial advantage in the case of processes where valves corrode and have to be renewed frequently.

Figure 7:
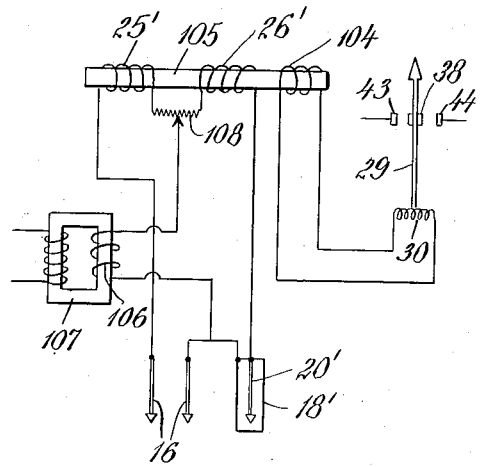
Fig. 7 is a diagrammatic view of a magnetic balance adapted for indicating changes in the electrical conductivity of the liquid or material under test.

The unbalancing of the bridge may be measured and utilized for the purposes of the invention by other arrangements than by direct connection of the galvanometer to the terminals of the bridge arrangement. Thus, in Fig. 7 of the drawings, a magnetic balance is illustrated for supplying the moving coil 30 of the galvanometer with appropriate electric currents indicating unbalancing of the bridge arrangement. The moving coil 30 is connected to a coil 104 mounted on a magnetic member 105. The magnetic member 105 also carries two other coils 25' and 26', corresponding to the resistance arms 25 and 26 of the arrangement described in connection with Fig. 1 of the drawings. The bridge arrangement is energized from the secondary winding 106 of a transformer 107, the secondary winding being connected to the adjustable contact of a resistance 108 intermediate the coils 25' and 26', and the common connection between one of the testing electrodes 16 and the electrode casing 18' of the standard or balancing element.

The coils 25' and 26' are so wound on the magnetic member 105 that the magnetic fields set up by the flow of current through these coils oppose each other, and therefore as long as the currents in these coils are the same, the resulting magnetic fields counteract each other, and no current is induced in the coil 104. When the current flowing between the control electrodes increases, the magnetic field due to the coil 25' increases and becomes greater than the magnetic field due to the coil 26' and consequently there is induced in the coil 104 a current causing a deflection of the galvanometer pointer 29 in one direction. Similarly, upon an increase in the resistance of the solution between the control or testing electrodes 16 there is induced in the coil 104 a current which reduces the amount of the deflection of the galvanometer pointer. By proportioning the current through the coils 25' and 26' it is thus possible to adjust the effect of the electrodes 18' and 20' on the balance to have the desired balancing result.

Figure 8:
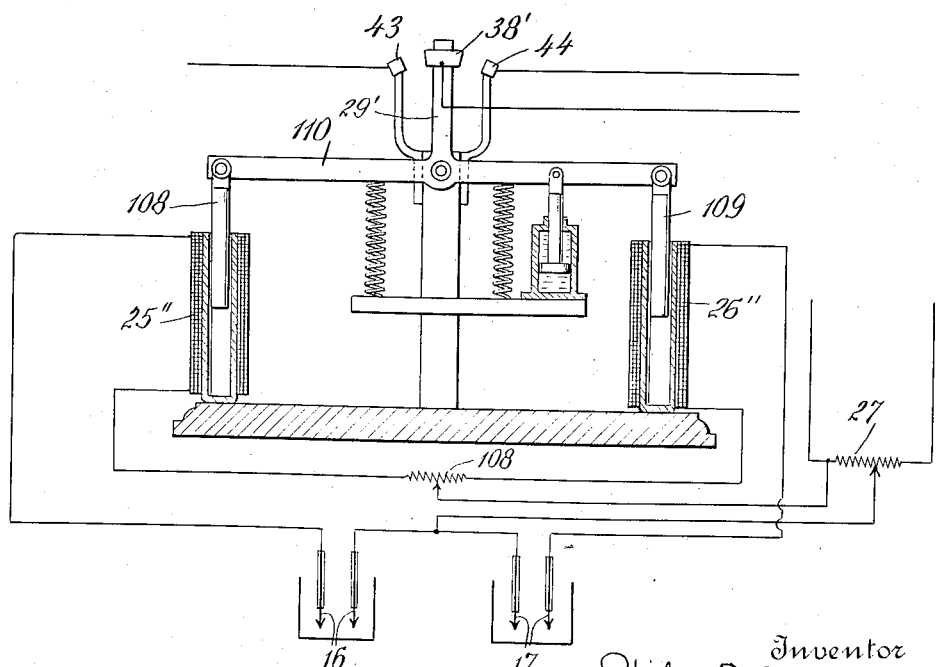
Fig. 8 is a diagrammatic view of an electro-magnetic balance for indicating variations in the electrical conductivity of the liquid or material under test.

In the modification illustrated in Fig. 8 of the drawings, the galvanometer, as such, is dispensed with, and an electro-magnetic balance is employed for operating the relay contacts in response to fluctuations in the electrical conductivity of the material under test. In this figure of the drawings similar elements are designated by the same reference characters as in the descriptions of the preceding figures of the drawings. The bridge arrangement comprises the control or testing electrodes 16, the standard or balancing element 17, and resistance arms 25" and 26" in the form of solenoid windings. The magnetic plungers 108 and 109 of the solenoid windings 25" and 26", respectively, are connected to a pivoted rocker arm 110 to which is secured an upright arm 29' carrying a contact member 38'. Unbalancing of the bridge arrangement, as the result of variations in the electrical conductivity of the material being treated, amounts, in effect, to variations in the relative strengths of the magnetic fields set up by the windings 25" and 26", and, accordingly, as one or the other of these magnetic fields predominates in strength the rocker arm 110 is thereby actuated so that contact 38' engages one or the other of the fixed contacts 43 or 44, as the case may be. The operation is otherwise the same as described in connection with Figs. 1 and 7 of the drawings.

Where it is desirable to effect a relatively slow movement of the stem of the controlled valve, a star-wheel driving device may be employed in the operative connections between the electric motor 50 and the valve stem 52. Thus, in Figs. 10 and 11 of the drawings, I have shown a star-wheel 111 secured to the valve stem 52 and adapted to be actuated by a cooperating drive-wheel 112 having a projecting lug adapted to engage the projections on the star-wheel 111. Thus, the star-wheel 111 is moved through one-sixth of a revolution by each complete revolution of the drive-wheel 112. The drive-wheel 112 is connected by a worm gear 53—54 and slip clutch 51 to the shaft of the electric motor 50.

The standard or balancing device may take the form of a resistance unit, preferably adjustable, of appropriate material having substantially a zero temperature coefficient of electrical conductivity. For example, manganin wire has been found suitable for this purpose. In Fig. 12 of the drawings I have illustrated an equipment embodying this feature of the invention. As represented in this figure, the testing electrodes 16 extend into the conduit 13, and a wire resistance 113 of iron, nickel, copper, or other material having a positive temperature coefficient enclosed in a protecting casing 114, if desired, is electrically connected in series therewith and to the arm 25—85 of the Wheatstone bridge arrangement. A resistance coil 132 of manganin wire is connected as one arm of the bridge arrangement. Otherwise the electrical connections of this modification of the invention are the same as described and illustrated in connection with Fig. 1 of the drawings.

The material between the electrodes 16 has a negative temperature coefficient and the wire resistance 113 is chosen so that with a temperature change the resistance 113 increases in resistance as much as the material between the electrodes 16 decreases in resistance, and vice versa for a fall of temperature. Instead of wire, the auxiliary resistance 113 may consist of a liquid resistance having a positive temperature coefficient ($x$), such as phosphoric acid or a mixture of mannite, boracic acid and water. Then as the temperature increases the conductivity between the electrodes 16 it decreases that in the auxiliary resistance 113. The auxiliary resistance 113 may be in either series or parallel connection to the electrodes 16.

Referring again to Fig. 1 of the drawings, the solenoid-operated switches 47 and 49 may be provided with damping means, such, for example, as dash pots 92 and 93 respectively. These dash pots may be appropriately adjusted to provide a desired time interval in the closing of the switches 47 and 49 after the engagement of the contacts of the galvanometer or other contact making instrument. By this means an appropriate time interval may be obtained so that temporary fluctuations in the electrical conductivity of the material being tested will not effect any change in the operation. In other words, as the result of the action of the dash pots 92 and 93, the switches 47 and 49, respectively, will not be closed unless the fluctuations in the electrical conductivity, upon which the operation of these switches depends, persist for a predetermined length of time.

In Fig. 14 of the drawings, I have shown an arrangement in which one set of testing electrodes 16$^a$ is inserted before the point of treatment, that is, before the reagent pipe 12 introduces the reagent into the conduit 13'', through which the raw liquor is flowing. Another set of testing electrodes 16$^b$ is inserted after the point of treatment. A parallel compensator comprising a liquid resistance of phosphoric acid, or other suitable material may be used in the standard or balancing elements 141 and 142, so that temperature does not change the resistance at the terminals 144 and 145. The terminals 144 and 145 are balanced by the bridge 25—85—26 as previously explained, so that the galvanometer 30—31 shows the change of condition of the treated material around the testing electrodes 16$^b$ with respect to the untreated raw material around the testing electrodes 16$^a$. This "before" and "after" plan is useful in applications where the raw material itself is subject to considerable changes.

In Fig. 15 of the drawings, I have diagrammatically represented a modification of the invention in which a differential galvanometer is employed. This differential galvanometer comprises field coils 31' and a moving coil 30$^a$—30$^b$. The moving coil is composed of two opposed sections 30$^a$ and 30$^b$ respectively connected to the testing electrodes 16 and compensating electrodes 17 as diagrammatically represented in Fig. 15. The transformer 39 furnishes the desired current for the apparatus, and in other respects the arrangement and operation is substantially the same as described in connection with Fig. 1 of the drawings.

In Fig. 16 of the drawings, I have shown a modified arrangement for introducing the desired time element in the control equipment. In accordance with the modification of this figure, only the relay circuit is periodically made operative and inoperative by the opening and closing of the current supply thereto. A constant speed electric motor 150, for example, a synchronous motor, is connected (through bevelled gears 151 and a worm gear drive 155) to a disk 152 of insulating material, such, for example, as bakelite. A metallic contact segment 153 is mounted at the periphery of the disk 152 and during each rotation of the disk operatively engages a fixed brush or sliding contact 154. A slip ring 158 is secured to the shaft of the disk 152 and rotates therewith and engages a brush or sliding contact 157. The sliding contact 157 is connected to one terminal of the source of energy supply for the relay windings 46 and 48 and the sliding contact 154 is connected to the common terminal of these windings. The other terminal of the energy supply source, (in Fig. 16, a transformer 156 having its primary winding connected to the supply means 37), is connected to the moving element or pointer 29 of the contact making instrument. The other electrical connections of the arrangement of this figure are substantially the same as described in connection with Fig. 1 of the drawings.

It will be observed from the foregoing description that the electrical connection of the relay windings 46 and 48 to the energy supply source 156 is completed only when the sliding contact 154 engages the contact segment 153. This engagement of these contacts occurs once during each revolution of the disk 152, and the design of the device is such that the energy supply is interrupted during such period of time as the reaction is occurring and adjusting itself which may be, for example, two minutes or more. Thus, at regular intervals of time, the contact segment 153 engages the sliding contact 154 and closes the energy supply 156 to the relay windings 46 or 48, as the case may be, provided the movable contact 38 of the contact making instrument, which is always left in circuit, happens to be in engagement with either of the fixed contacts 43 or 44. An appropriate timing for many industrial applications of the invention is to have the contacts 153 and 154 open during two minutes and closed during twenty seconds.

The constant speed electric motor 150 functions as a time-keeping mechanism and, as hereinbefore suggested, a clock-work or other appropriate time keeping device may be substituted for the motor 150 for the purpose of driving the disk 152 at constant speed. It will be obvious that while the contacts 153 and 154 are open, the controlling relays cannot operate the valve control mechanism, thus giving the process opportunity to catch up with the last correction made. Even if contact 38 should be in engagement with either of the fixed contacts 43 or 44, while the contacts 153 and 154 are out of engagement, no change can be made in the reagent supply until the contacts 153 and 154 again come into engagement. In actual practice, it very often happens that when these contacts 153 and 154, come into engagement, the contact 38 will have again moved free from either the contact 43 or the contact 44, due to the correction made in the reagent supply. The rotary switch just described is used with advantage in place of the dash-pots 92 and 93 of the arrangement of Fig. 1 when longer time intervals are required on slowly mixing materials.

Damping of the various relays in the control equipment is desirable for accurate results. Voltage fluctuations and unimportant transient changes are thereby prevented from falsely operating the control equipment. The contacts on the galvanometer, or equivalent contact making device, can be used in various ways to shut off one or more or turn on a plurality of valves, or change the speed of a motor driving a draft, pump or feed, as required, by means of appropriate relays. For example, one contact can be normally closed and opened automatically when a certain conductivity in the mix is attained. The sensitivity range of the galvanometer is better than the apparent swing required to move the contact 38 from one fixed contact (43 or 44) to the other. I may work wholly at one contact point and use the other only for correction, in case the treatment oversteps too far. By operating on a break of the contacts rather than a make, very close accuracy may be attained since a very slight current change then operates the control devices.

Thus, it is seen that the galvanometer may be used with either make or break of the contacts, or both, as required. The electrically operated valves used may be any automatic electrically actuated valves and the motive power controlled electrically to operate the valves may be obtained from a spring, air pump, steam, or other convenient power source. The relays may be used to operate a plurality of control devices as required.

In making an initial test on a new problem to determine adjustments, samples from the plant or process are taken and tried out on a laboratory scale under working conditions. The resistance and behavior with changes of the samples are noted and adjustments are made so that the desired limits are attained. The contacts are then set for the desired result.

On actual commercial problems, I have been able to obtain good accuracy with the improvements herein set forth. In some cases, results have been substantially perfect over a long period of time and in others the accuracy has been as close as 0.03% correct. Usually, the automatic control is superior to any hand methods heretofore known, and processes heretofore conducted on intermittent plan to permit hand sampling and hand control may, with the improvements herein set forth, be operated continuously with large savings in the cost of manufacture. The constant end product is maintained at will and if any variations occur they are immediately self corrected in the manner herein described.

On good conductors or electrolytes, I believe that the apparatus operates principally on the amount of dissociated ions present in the mix, but on poor conductors I believe that the result is partly or largely due to the di-electric effect of the material, that is, the specific di-electric constant between the testing electrodes is a factor in the case of poor conductors. Mixes behave according to the materials concerned; sometimes the individual components, each of which has a certain conductivity alone, add their effects and sometimes they do not, but in any case I ascertain what effect a change of the constituent parts of the mix has and arrange the circuits accordingly to control the supply for the result desired.

In locating the apparatus, which is in the nature of an attachment to the usual equipment required in the treatment process, care must be taken to insulate the circuits and to protect the control devices from acid fumes, etc. This may be done by enclosing the several parts in lead-lined boxes with insulating portions for the wire terminals thereof. Essentially, there are three assembled parts of the control equipment: Namely, (1) the testing electrodes with the compensating element, (2) the controller with the galvanometer, bridge, transformers, relays, etc., (3) the electrically-operated valve or material control. The electrodes are best placed at the nearest point to that where the desired result occurs or is completed. Lead-covered cables are best used for connections therefrom to the controlling device.

The auxiliary controlling device may be arranged to reverse the action of the motive means on the control valve upon the occurrence of a predetermined condition in the medium under test. Thus, for example, in the production of 65° Be'. sulphuric acid as hereinbefore described, if a decrease in the conductivity of the material between the testing electrodes is, in the normal operation of the apparatus, caused to turn the control-valve so as to decrease the supply of concentrated acid to the mixing receptacle, the control-valve is, in accordance with the present modification of the invention, turned to cause an increase in the supply of concentrated acid whenever the hydrometer balance indicates a specific gravity below a predetermined value. In other words, the auxiliary controlling device is employed to regulate the character of the control in the vicinity of a hump in the characteristic conductivity curve so as to insure the proper control regardless of which side of the hump the conductivity responsive control means may momentarily be operating.

Figure 17:
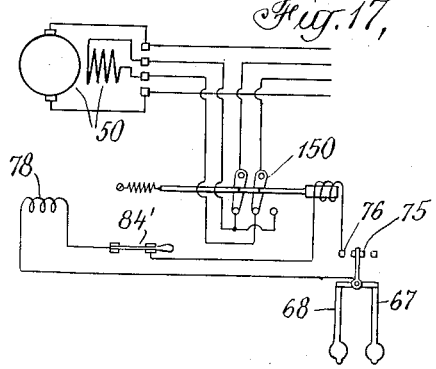

Fig. 17 of the drawings diagramatically illustrates an equipment embodying the foregoing principles. Thus the hydrometer balance is arranged to actuate a reversing switch 150 which reverses the direction of rotation of the motor 50 whenever the specific gravity of the mixed product falls below a predetermined critical value. As long as the specific gravity of the mixed product remains above this critical value the reversing switch remains in its normal operating position. Similar elements in Fig. 17 are represented by the same reference character as in the preceding figures.

The intermediate resistance 85 with its adjustable contact 86 permits an adjustment of the relative values of the two resistance arms 25 and 26 of the bridge arrangement. In this manner suitable adjustment may be made for different conductivities between the testing electrodes. This adjustable resistance 85 together with the adjustable contacts 43 and 44 gives the apparatus a large degree of flexibility.

Where alternating currents are used the humming of the various relays in the equipment may be utilized to effect the desired jarring of the contacts 38 and 43, or 38 and 44, as the case may be. To this end, it is of advantage to position one or more of the relays of the equipment on the panel carrying the contact-making instrument.

While an arrangement particularly for control has been described, it is obvious that the circuits and arrangements shown may also be used with the indicator 29—91 and bridge 25—85—26 together with the compensators alone without the automatic valve control, so that on certain applications, as, for example, small batch work where only semi-automatic operation is desired, the advantages of the compensated indicator described may still be had to govern and assist the usual hand manipulation.

I claim:

1. A method for the purposes herein set forth, which comprises producing an action responsive to changes in a varying characteristic of an appropriate component of a treatment process, compensating said action for changes in said varying characteristic resulting from changes in temperature, employing said action to effect a pre-determined desired control of the treatment process, and introducing an appropriate time element into said last mentioned step to compensate for the time required for any change in the control of the treatment process to influence said action.

2. A method for the purposes herein set forth, which comprises producing an action responsive to changes in a varying characteristic of an appropriate component of a treatment process, employing said action to effect a pre-determined desired control of the treatment process, and introducing an appropriate time element into said last mentioned step to compensate for the time required for any change in the control of the treatment process to influence said action.

3. A method for the purposes herein set forth, which comprises producing an action responsive to changes in the electrical conductivity of an appropriate component of a treatment process, compensating said action for changes in the electrical conductivity of said component resulting from changes in temperature, employing said action to effect a pre-determined desired control of the treatment process, and introducing an appropriate time element into said last mentioned step to compensate for the time required for any change in the control of the treatment process to influence said action.

4. A method for the purposes herein set forth, which comprises producing an action responsive to changes in the electrical conductivity of an appropriate component of a treatment process, employing said action to effect a predetermined desired control of the treatment process, and introducing an appropriate time element into said last mentioned step to compensate for the time required for any change in the control of the treatment process to influence said action.

5. A method for the purposes herein set forth, which comprises producing an action responsive to changes in the electrical conductivity of a material undergoing treatment, employing changes in said action to effect predetermined modifications in the treatment of said material, and appropriately retarding the modification in the treatment of said material in response to changes in said action so as to compensate for the time required for said action to respond to the modification in the treatment.

6. A method for the purposes herein set forth, which comprises producing an action responsive to changes in a varying characteristic of an appropriate component of a treatment process, employing said action to effect a predetermined desired control of the treatment process, and periodically interrupting any modification in the treatment process in response to changes in said action so as to compensate for the time required for any change in the control of the treatment process to influence said action.

7. A method for the purposes herein set forth, which comprises producing an action responsive to changes in the electrical conductivity of an appropriate component of a treatment process, compensating said action for changes in the electrical conductivity of said component resulting from changes in temperature, employing said action to effect a pre-determined desired control of the treatment process, and periodically interrupting any modification in the treatment process in response to changes in said action so as to compensate for the time required for said action to respond to the modification in the treatment process.

8. A method for the purposes herein set forth, which comprises producing an action responsive to changes in the electrical conductivity of an appropriate component of a treatment process, employing said action to effect a pre-determined desired control of the treatment process, and periodically interrupting any modification in the treatment process in response to changes in said action so as to compensate for the time required for said action to respond to the modification in the treatment process.

9. A method for the purposes herein set forth, which comprises producing an action responsive to changes in a varying characteristic of an appropriate component of a treatment process, compensating said action for changes in said varying characteristic resulting from changes in temperature, employing said action to effect a pre-determined desired control of the treatment process, and periodically interrupting any modification in the treatment process in response to changes in said action so as to compensate for the time required for said action to respond to the modification in the treatment process.

10. A method for the purposes herein set forth, which comprises producing two independent actions responsive respectively to two different varying characteristics of an appropriate component of a treatment process, compensating each of said actions for changes in its respective varying characteristic resulting from changes in temperature, and employing each of said actions to effect a predetermined desired control of the treatment process.

11. A method for the purposes herein set forth, which comprises producing two independent actions responsive respectively to two different varying characteristics of an appropriate component of a treatment process, compensating each of said actions for changes in its varying characteristic resulting from changes in temperature, and employing one of said actions to effect a predetermined rough-control of the treatment process and the other of said actions to effect a further and more delicate control of the treatment process.

12. A method for the purposes herein set forth, which comprises producing two independent actions responsive respectively to two different varying characteristics of an appropriate component of a treatment process, employing each of said actions to effect a pre-determined desired control of the treatment process, and introducing an appropriate time element into the control of the treatment process in response to changes in one of said actions so as to compensate for the time required for any change in the control of the treatment process to influence this action.

13. A method for the purposes herein set forth, which comprises producing two independent actions responsive respectively to two different varying characteristics of an appropriate component of a treatment process, employing one of said actions to effect a pre-determined rough control of the treatment process, employing the other of said actions to effect a further and more delicate control of the treatment process, and introducing an appropriate time element into said last mentioned step to compensate for the time required for any change in the control of the treatment process to influence said other action.

14. A method for the purposes herein set forth, which comprises producing an action responsive to changes in the electrical conductivity of an appropriate component of a treatment process, producing an independent action responsive to changes in the density of said component, compensating each of said actions for changes in the electrical conductivity and the density respectively resulting from changes in temperature, and employing each of said actions to effect a pre-determined desired control of the treatment process.

15. A method for the purposes herein set forth, which comprises producing an action responsive to changes in the electrical conductivity of an appropriate component of a treatment process, producing an independent action responsive to changes in the density of said component, and employing each of said actions to effect a pre-determined desired control of the treatment process.

16. A method for the purposes herein set forth, which comprises producing an action responsive to changes in the electrical conductivity of an appropriate component of a treatment process, producing an independent action responsive to changes in the density of said component, and employing one of said actions to effect a pre-determined rough control of the treatment process and the other of said actions to effect a further and more delicate control of the treatment process.

17. A method for the purposes herein set forth, which comprises producing an action responsive to changes in the electrical conductivity of an appropriate component of a treatment process, producing an independent action responsive to changes in the density of said component, employing the density responsive action to effect a pre-determined rough control of the treatment process, employing the conductivity responsive action to effect a further and more delicate control of the treatment process, and introducing an appropriate time element into said last mentioned step to compensate for the time required for any change in the control of the treatment process to influence said conductivity responsive action.

18. A method for the purposes herein set forth, which comprises subjecting a pre-determined test portion of an appropriate component of a treatment process to auxiliary treatment for suitably altering a varying characteristic thereof so that changes in said characteristic are unmistakably indicative of similar changes in a corresponding varying characteristic of the component itself, producing an action responsive to changes in said varying characteristic of said treated test portion, and employing said action to effect a pre-determined desired control of the treatment process.

19. A method for the purposes herein set forth, which comprises subjecting a pre-determined test portion of an appropriate component of a treatment process to auxiliary treatment for suitably altering a varying characteristic thereof so that changes in said characteristic are unmistakably indicative of similar changes in a corresponding varying characteristic of the component itself, producing an action responsive to changes in said varying characteristic of said treated test portion, compensating said action for changes in said varying characteristic of said test portion resulting from changes in temperature, and employing said action to effect a pre-determined desired control of the treatment process.

20. A method for the purposes herein set forth, which comprises subjecting a pre-determined test portion of an appropriate component of a treatment process to dilution with an appropriate solvent for suitably altering a varying characteristic thereof so that changes in said characteristic are unmistakably indicative of similar changes in a corresponding varying characteristic of the component itself, producing an action responsive to said varying characteristic of said diluted test portion, and employing said action to effect a pre-determined desired control of the treatment process.

21. A method for the purposes herein set forth, which comprises continuously modifying the electrical conductivity of a continuously withdrawn test portion of an appropriate component of a treatment process so that changes in the electrical conductivity of the modified test portion are unmistakably indicative of relative changes in the concentration of the component itself, producing an action responsive to changes in the electrical conductivity of said modified test portion, and employing said action to effect a pre-determined desired control of the treatment process.

22. A method for the purposes herein set forth, which comprises continuously withdrawing a test portion of an appropriate component of a treatment process and suitably altering the electrical conductivity thereof so that changes in the conductivity of the altered test portion are unmistakably indicative of relative changes in the concentration of the component itself, producing an action responsive to changes in the conductivity of said altered test portion, and employing said action to effect a pre-determined desired control of the treatment process.

23. A method for controlling the concentration of sulfuric acid in a product produced by mixing liquids of different degrees of concentration with respect to sulfuric acid, which comprises diluting a pre-determined test portion of the product and thereby appropriately altering the electrical conductivity thereof so that changes in the conductivity of the diluted test portion are unmistakably indicative of certain changes in the concentration of the product, producing an action responsive to changes in the conductivity of said diluted test portion, and employing said action to effect a pre-determined desired control of the treatment process.

24. A method for controlling the concentration of sulfuric acid in a product produced by mixing liquids of different degrees of concentration with respect to sulfuric acid, which comprises continuously producing an appropriately diluted test portion of said product so that changes in the electrical conductivity of said diluted test portion are indicative of certain changes in the concentration of the product, producing an action responsive to changes in the conductivity of said diluted test portion, and employing said action to effect a pre-determined desired control of the treatment process.

25. An apparatus for the purposes herein set forth, comprising means for producing an action responsive to changes in the electrical conductivity of an appropriate component of a treatment process, means for producing an independent action responsive to changes in the density of said component, means for employing the density responsive action to effect a predetermined rough control of the treatment process, and means for employing the conductivity responsive action to effect a further and more delicate control of the treatment process.

26. An apparatus for the purposes herein set forth, comprising means including cooperating electrical contacts for producing an action responsive to changes in the electrical conductivity of an appropriate component of a treatment process, means for causing said action to effect a predetermined desired control of the treatment process, and means for adjusting the operative relation of said contacts whereby appropriate adjustment may be made of the influence of said action on the treatment process.

27. An apparatus for the purposes herein set forth, comprising means including a testing element and a compensating element and cooperating electrical contacts for producing an action responsive to changes in the electrical conductivity of an appropriate component of a treatment process, and means for causing said action to effect a predetermined desired control of the treatment process, said cooperating contacts comprising a movable contact and a pair of fixed contacts relatively adjustable with respect to the zero position of said movable contact.

28. An apparatus for the purposes herein set forth, comprising means including a testing element and a compensating element for producing an action responsive to changes in the electrical conductivity of an appropriate component of a treatment process and independent of temperature changes of the component, two movable magnetic members and cooperating magnetizing coils, electrical means for producing a magnetization of one of said coils proportional to the electrical conductivity of said testing element and for producing a magnetization of the other of said coils proportional to the conductivity of said compensating element, and means including a balancing device influenced by each of said magnetic members for effecting a predetermined control of the treatment process in responsive to changes in the relative magnetizing effects of said coils.

29. An apparatus for the purposes herein set forth, comprising means including a testing element and a compensating element for producing an action responsive to changes in the electrical conductivity of an appropriate component of a treatment process and independent of temperature changes of the component, a pair of magnetizing coils, electrical means for producing a magnetization of one of said coils proportional to the electrical conductivity of said testing element and for producing a magnetization of the other of said coils proportional to the electrical conductivity of said compensating element, and means including a device responsive to changes in the relative magnetizing effects of said two coils for effecting a predetermined control of the treatment process.

30. An apparatus for the purposes herein set forth, comprising means including a testing element and a compensating element for producing an action responsive to changes in the electrical conductivity of an appropriate component of a treatment process and independent of temperature changes of the component, a pair of magnetizing coils, electrical means for producing a magnetization of one of said coils proportional to the electrical conductivity of said testing element and for producing a magnetization of the other of said coils proportional to the electrical conductivity of said compensating element, and means including an instrumentality influenced by each of said coils for effecting a predetermined control of the treatment process in response to changes in the relative energizing effects of said coils.

31. An apparatus for the purposes herein set forth comprising means including a testing element and a compensating element for producing an action responsive to changes in the electrical conductivity of an appropriate component of a treatment process and independent of temperature changes of the component, said compensating element including a receptacle containing an electrolyte of different chemical composition than said component, but having a temperature coefficient of electrical conductivity approximately equivalent to that of said component.

32. An apparatus for the purposes herein set forth, comprising means for producing an action responsive to changes in a varying characteristic of an appropriate component of a treatment process, means including a motive element operatively connected to a control element for employing said action to effect a predetermined desired control of the treatment process, and a slip clutch included in the operative connection between said motive element and said control element.

33. An apparatus for the purposes herein set forth, comprising means for producing an action responsive to changes in a varying characteristic of an appropriate component of a treatment process, means including a motive element operatively connected to a control element for effecting a predetermined desired control of the treatment process, and a worm gear drive in the operative connection between said motive element and said control element whereby said motive element drives said control element.

34. An apparatus for the purposes herein set forth, comprising means for producing an action responsive to changes in a varying characteristic of an appropriate component of a treatment process, a control element for the treatment process, a motive element for actuating said control element, means controlled by said action for placing said motive element in operation, and means for periodically interrupting the operation of said motive element during such times as the nature of said action tends to place the motive element in operation.

35. An apparatus for the purposes herein set forth, comprising means including a testing element and a compensating element for producing an action responsive to changes in the electrical conductivity of an appropriate component of a treatment process, and means for causing said action to effect a predetermined control of the treatment process, said compensating element including a resistance unit having a temperature coefficient of electrical conductivity of opposite sign to that of said component.

36. An apparatus for the purposes herein set forth, comprising means including a testing element and a compensating element for producing an action responsive to changes in the electrical conductivity of an appropriate component of a treatment process, and means for causing said action to effect a predetermined control of the treatment process, said compensating element including a resistance unit having a temperature coefficient of electrical conductivity of opposite sign to that of said component and connected in series relation therewith and a second resistance unit having substantially a zero temperature coefficient of conductivity electrically associated therewith.

37. An apparatus for the purposes herein set forth, comprising means including a testing element and a compensating element for producing an action responsive to changes in the electrical conductivity of an appropriate component of a treatment process, and means for causing said action to effect a predetermined control of the treatment process, said compensating element including a metallic container serving as one electrode thereof and an electrode insulatively mounted in said container.

38. An apparatus for the purposes herein set forth, comprising means for producing an action responsive to changes in the electrical conductivity of an appropriate component of a treatment process, means for producing an independent action responsive to changes in the density of said component, a control element for said treatment process operatively associated with said conductivity responsive means, an independent control element for said treatment process operatively associated with said density responsive means, and means for causing the actions of said conductivity responsive means and said density responsive means to effect predetermined operations of their respective control elements.

39. An apparatus for the purposes herein set forth, comprising means for producing an action responsive to changes in a varying characteristic of an appropriate component of a treatment process, a control valve having an adjusting wheel for effecting a predetermined control of the treatment process, a motive element, means including a removable clamp associated with said wheel for operatively connecting said valve to said motive element, and means controlled by said action for placing said motive element in operation.

40. An apparatus for the purposes herein set forth, comprising means for producing an action responsive to changes in a varying characteristic of an appropriate component of a treatment process, a control valve having an adjusting wheel for effecting a predetermined control of the treatment process, a motive element, means including a removable clamp associated with said wheel and a flexible shaft having a slip clutch operatively connected thereto for driving said valve from said motive element, and means controlled by said action for placing said motive element in operation.

41. An apparatus for the purposes herein set forth, comprising means for producing an action responsive to changes in a varying characteristic of an appropriate component of a treatment process, a control element for the treatment process, a motive element, means controlled by said action for placing said motive element in operation, and means including a relatively large gear reduction for operatively connecting said control element to said motive element thereby providing a time element for compensating for the time required for any change in the control of the treatment process to influence said action.

42. A method for the purposes herein set forth, which comprises producing two independent actions responsive respectively to two different varying characteristics of an appropriate component of a treatment process, employing one of said actions to effect a predetermined desired control of the treatment process, and employing the second of said actions to insure the desired control by the other action.

43. The method of obtaining a standard end product from a mixture in a process which consists in obtaining a test portion thereof, adding a reagent, such, for example, as water, to said test portion, obtaining the electrical condition of said treated test portion, automatically deducting therefrom the part of said electrical condition due to variations in temperature, and causing this net electrical condition to control the treatment of the mixture from which the test portion is taken.

44. The method of continuously and automatically producing a standard end product from a process, which consists in electromechanically modifying the treatment of a material in accordance with the conductivity of a portion of said end product after such part of said conductivity which is not due to said treatment is deducted therefrom, the deduction being accomplished by opposing the conductivity of a portion of said material before said treatment to the aforesaid conductivity of a portion of the end product.

45. The method of producing a standard end product from a mixture in a process which consists in inserting electrodes into a test portion thereof, placing the resistance comprised between said electrodes in relation with a metallic resistance member the resistance of which changes in accordance with the temperature affecting said electrodes, thus obtaining the net resistance between said electrodes, amplifying variations in the electrode resistance thus compensated for temperature error, controlling an electrical circuit including means to modify the treatment of said mixture by means of said amplified variations, further controlling the said electrical circuit in accordance with the time required for said mixture to attain its end product stage, and further modifying said electrical circuit in accordance with variations in the components of said mixture, whereby said treatment is modified by the correlated effects aforestated.

46. The method of producing a standard result from a part of a process which consists in controlling the material in process automatically by means of an electrical circuit which is in turn jointly and cooperatively controlled by the time required for treatment of said material, by the electrical condition of said material, by means opposing such portion of the electrical condition of the material as is due to temperature variations, and by means opposing such remaining part of said electrical condition of the material as is due to undesired variations in a part of the supply furnishing said material, whereby the net control causes said electrical circuit to automatically modify the treatment of said material in process as required to maintain said standard result therefrom.

47. The method of automatically modifying a mixture in process by electrically actuated means jointly controlled and modified by the time of reaction, the electrical condition due to the chemical condition in the mixture, the electrical condition in the mixture which is caused by temperature changes, and the electrical condition in the mixture which is caused by variations in the supply furnishing a part of said mixture, as set forth, whereby a constant end product is continuously obtainable from said operation.

48. The hereindescribed method of making a process control itself, which consists in applying electrically actuated treating means to said process, operating said treating means in accordance with electrical controls, and both actuating and modifying said electrical controls in turn by the joint action of the several chemical, physical, and time factors affecting said process, correlated so that the control from one of said factors is dependent upon the contemporaneous control from the others.

49. The method of standardized process control which consists in mixing a sample obtained from the material in process with water, actuating an electrical controller in accordance with the compensated conductivity of said water mixture, and modifying the treatment in said process by electrically actuated means which are in turn operated by said electrical controller.

50. In apparatus of the character set forth, in combination, means to continuously obtain a sample of a material in process, means to compensate for the effect of temperature and chemical variations in a part of said material and for the time required for uniformly modifying said material, a combined indicator and controller operated by the compensated fluctuations of said sample portion, and means controlled therefrom to modify the supply from which said sample is taken.

51. In apparatus of the character set forth, in combination, calibrated means to continuously obtain the electrical condition of a material in process, an alternating current source of actuating supply, transformers to electrically insulate said source of supply from said material in process, an alternating current galvanometer operated on the aforesaid electrical condition, means to maintain correct phase relations in the windings of said galvanometer, to insulate the several circuits of said galvanometer, and to dampen the movement of the coil of the galvanometer, contacts in relation to the moving coil thereof, means to prevent said contacts from sticking, relays connected to said contacts, and a motor controlled via said relays and in turn connected to means for modifying said material in process.

52. In apparatus of the character described, means to secure a plurality of insulated secondary current sources from an alternating current supply, a Wheatstone bridge actuated by one of said sources and including a test set of electrodes and a temperature compensator therefor, an alternating current galvanometer having its field coils and moving coil connected to said bridge and current source in correct phase relation, relays controlled by said galvanometer, an electrically actuated valve operated via said relays, and means to correctly time the interaction of the said electrical circuits.

53. In a system of the character set forth, means to continuously obtain the net conductivity of a material in process with the effects of polarization, fluctuating voltage, temperature changes, and variation in part of the supply of said material compensated out, an alternating current controller actuated by said net conductivity, and means to modify said process operated via said controller in correct time relation to said process.

54. In combination, means to continuously obtain the electrical condition of a material in process, an adjustable temperature compensator therefor, a transformer and an alternating current supply therefor, a controller including contacts actuated by the combined conductivity effects in the aforesaid electrical circuit, means to prevent said contacts from sticking due to electrical cohesion, relays connected to said contacts, means to time said relays, a motor controlled by said relays, and means for transmitting the power from said motor to a modifier of the treatment of said material in process so that the adjustment thereof will not change when said motor is at rest.

55. In apparatus of the class set forth, a valve controlling a supply line, a motor driving said valve through self-locking means which retain the adjustment when said motor is at rest, relays controlling said motor, means to adjust the time of operation of said valve, and a controller for the relays, said controller being in turn actuated by the net compensated conductivity of a mixture fed by said supply line, and a current supply and transformer whereby the several circuits aforesaid are electrically insulated from each other.

56. In combination, electrodes having compensating means for obtaining the net conductivity of a portion of a material under process, an alternating current controller actuated by fluctuations between said electrodes, a motor operated valve actuated via said controller, a current supply for the whole and divided via transformers so that the several circuits aforesaid are electrically separate, and means to retain the adjustment of said valve when said motor is not running.

In testimony whereof I affix my signature.

PHILIP E. EDELMAN.